July 24, 1951          H. H. VANDERZEE          2,561,830
FLEXIBLE SLIP COUPLING
Filed Dec. 27, 1945
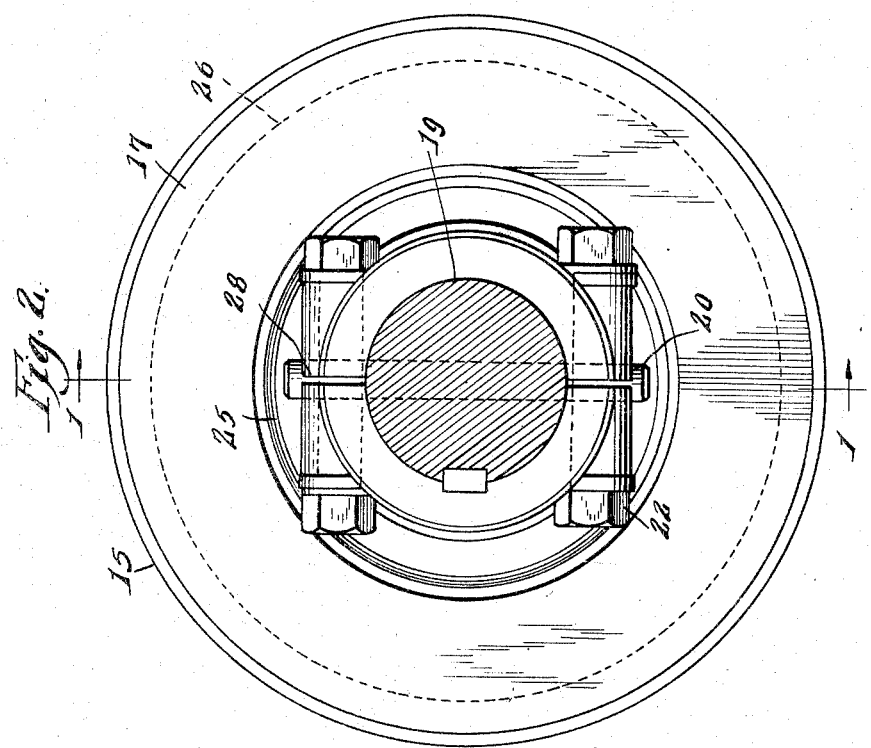
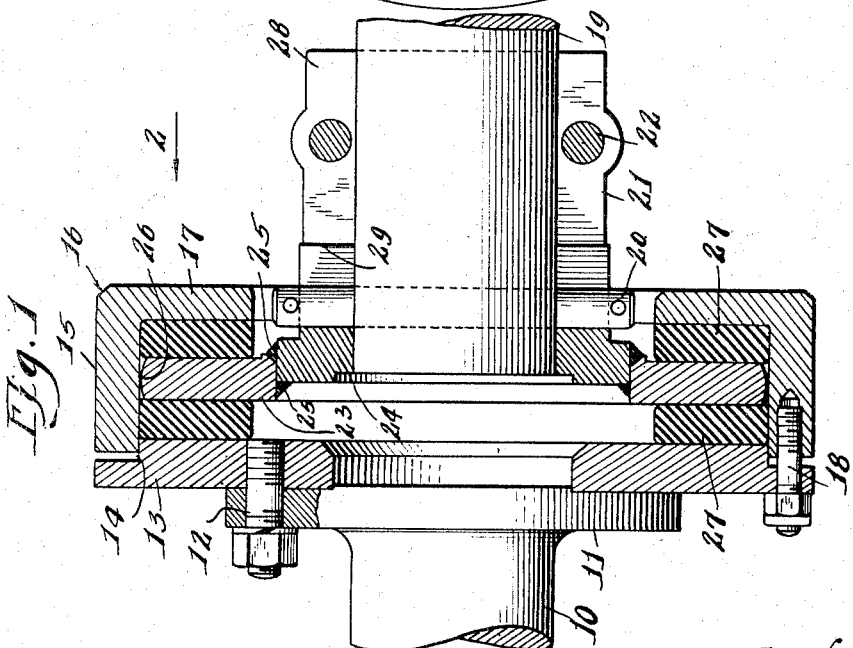
Inventor:
Harry H. Vanderzee.
By
Attorney.

Patented July 24, 1951

2,561,830

UNITED STATES PATENT OFFICE 2,561,830

FLEXIBLE SLIP COUPLING

Harry H. Vanderzee, Racine, Wis., assignor to Twin Disc Clutch Company, Racine, Wis., a corporation of Wisconsin Application December 27, 1945, Serial No. 637,444

2 Claims. (Cl. 64—30)

My invention relates to flexible couplings for transmitting power and more particularly to a structural arrangement of this type which embodies advantages additional to those ordinarily found in units of this character.

The principal object of the invention is to provide a flexible coupling for transmitting power which, in addition to possessing the usual capacity of such units to compensate for angular and lateral or offset misalignment between the driving and driven shafts or members, also is arranged to slip rotarily in the event of overload, thereby preventing breakage of the parts of the connected apparatus and stalling of the power source.

A further object is to devise a coupling of the character indicated which frictionally transmits power through compressed elastic or cushion members that also act to absorb torsional vibrations.

A further object is to provide a flexible slip coupling as above set forth which may be readjusted whenever necessary to take up wear in the friction elements and thus maintain the full power transmitting capacity of the coupling.

These and further objects of the invention will be set forth in the following specification, reference being had to the accompanying drawing, and the novel means by which said objects are effectuated will be definitely pointed out in the claims.

In the drawing:

Fig. 1 is a sectional elevation of the coupling as taken along the line 1—1 in Fig. 2.

Fig. 2 is an end view of the coupling looking in the direction of the arrow 2 in Fig. 1.

Referring to the drawing, the numeral 10 designates a shaft, which for purpose of description, will be regarded as the driving member, although it will be understood that the direction of power flow through the coupling is immaterial. At the coupling end, the shaft 10 carries a flange 11 which is secured by means of studs 12 to an abutment ring 13 having an annular shoulder 14 that is coaxial with the shaft and is located on the side of the ring opposite to the flange. Slidably mounted on the shoulder 14 is the annular wall 15 of a pressure cup 16 which faces toward and has its transverse wall 17 spaced from the ring 13. The cup is secured to the ring 13 by studs 18.

The numeral 19 designates the driven shaft and drivably secured thereto by a pin 20 is a hub 21 which is preferably split between the pin and the right end of the hub, as viewed in Fig. 1. Bolts 22 bridged between the split portions of the hub serve to grip the hub on the shaft. A driven ring 23 is secured to the unsplit end 24 of the hub, preferably by welds 25—25, and is located so that the side thereof which faces the ring 13 extends beyond the adjacent end of the hub. The periphery 26 of the ring 23 is spaced slightly from the inner surface of the wall 15 and is partispherically shaped, thus enabling the coupling to compensate for angular and offset misalignment of the shafts. Cushion or elastic rings 27, preferably made of rubber, natural or synthetic, are positioned between the coacting faces of the rings 13 and 23 and between the coacting faces of the ring 23 and wall 17. To condition the coupling for the normal transmission of power, the rings 27 are compressed by the cup 16 sufficiently to establish the required frictional contact with the above mentioned faces of the rings 13 and 23 and the wall 17, the annular wall 15 confining the outer, peripheral surfaces of the rings 27 and the rings 27 being otherwise free of any positive connection to the other coupling parts. The slits 28 which divide the major portion of the hub 21 are widened as at 29 in the vicinity of the pin 20 so that the hub may be positioned as desired axially of the shaft and relative to the pin.

During normal operation, the shafts 10 and 19 rotate at the same speed and power is frictionally transmitted through elements which compensate for any practical misalignment of the shafts and which additionally provide for a cushioned flow of this power. During periods of overload, the speed of the shaft 19 falls below that of the shaft 10, but the coupling continues to transmit power due to the slip characteristic embodied in the frictional drive, the necessary slippage occurring between the coacting faces of the friction elements. The slip of the coupling will also accommodate stalling of the shaft 19 for short periods, thus avoiding damage to or stoppage of the power source. Adequate capacity is insured by the use of a pair of cushion rings.

As wear of the cushion rings 27 occurs, recompression of these rings may be easily reestablished by the cup 16 and studs 18. The offsetting of the driven ring 23 relative to the end of the hub enables this adjustment to be made up to the practical limit of usability of the rings 27.

I claim:

1. In a coupling, the combination of substantially coaxial and axially spaced, first and second members each having a flat ring secured thereto, the rings being axially spaced, a pressure element slidable on the first member ring and having a flat, annular part axially spaced from the second member ring, rubber rings interposed between the first and second member rings and pressure element part, respectively, and bolt means carried by the first member ring and engageable with the pressure element to adjustably compress the rubber rings and provide a friction drive between the members, the pressure element including an annular wall for confining the outer peripheries of the rubber rings.

2. In a coupling, the combination of substantially coaxial and axially spaced, first and second members each having a flat ring secured thereto, the rings being axially spaced, a pressure element slidable on the first member ring and having a flat annular part axially spaced from the second member ring, rubber rings interposed between the first and second member rings and pressure element part, respectively, and bolt means carried by the first member ring and engageable with the pressure element to adjustably compress the rubber rings and provide a friction drive between the members, the pressure element including an annular wall for confining the outer peripheries of the rubber rings and the outer peripheral face of the second member ring lying close to the inner surface of the annular wall and being parti-spherically shaped to accommodate angular and offset misalignments of the members.

HARRY H. VANDERZEE.

REFERENCES CITED

The following references are of record in the file of this patent:

UNITED STATES PATENTS

| Number | Name | Date |
|---|---|---|
| 2,067,284 | Pearce | Jan. 12, 1937 |
| 2,224,478 | Jones | Dec. 10, 1940 |
| 2,247,163 | Bradley | June 24, 1941 |